INVENTOR
BARTUS A. NIJLAND
BY
Robert Burns
ATTORNEY

Patented July 18, 1950

2,516,070

UNITED STATES PATENT OFFICE 2,516,070

APPARATUS FOR MOLDING CONCRETE ROOF TILE OR THE LIKE

Bartus A. Nijland, Twello, Netherlands

Application July 31, 1947, Serial No. 764,988
In the Netherlands October 8, 1945

2 Claims. (Cl. 25—43)

It is well known in the art that it offers a certain amount of difficulty to manufacture relatively finely profilated concrete work pieces such as tiles, slabs and the like by a pressing, stamping, vibrating or equivalent operation. Owing to the nature of said material, thin ribs and other projections are likely to be damaged during the emptying of the mould box.

Said inconvenience can be overcome, in accordance with the invention, by the employment of an apparatus which comprises a frame wherein the work piece is moulded between a bottom plate and a top plate adapted, together with the work piece, to be raised relative to the frame. Now, in accordance with the invention, the bottom face of the top plate is constituted substantially as a ruled surface having parallel, straight generators, and secured to the frame is a templet, whose profile is located above the top edge of the frame and forms the direct continuation of said ruled surface when the latter has been raised to the level of said profile.

If, in apparatus of this type, the work piece has been moulded in the ordinary manner and has been raised, together with the top plate and the bottom plate, so far that the bottom face of the top plate is flush with the profile of the templet, the top plate can be removed from the work piece by a movement in the direction of the generators of the ruled surface of both top plate and templet. During said movement, the work piece is withheld by the templet so that it cannot be damaged.

Although, as will be apparent from the above, an apparatus in accordance with the invention can only be used for the manufacture of a work piece whose top face is bounded by a ruled surface having parallel, straight generators, it will be appreciated that on the side opposite the templet the work piece may be provided with ribs or other projections not bounded by said lines, provided that these ribs or projections do not interfere with the removal of the top plate in the manner referred to hereinbefore.

Figure 1:
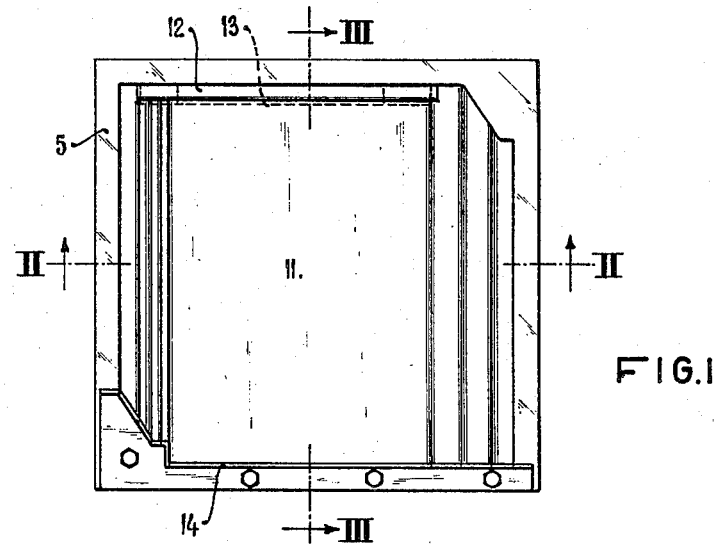
Figure 2:
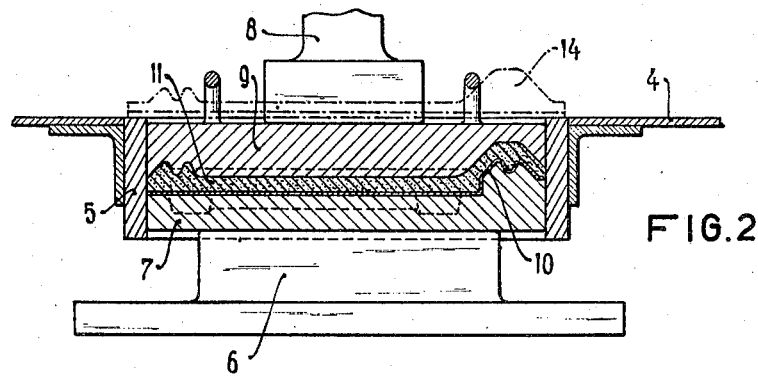
Figure 3:
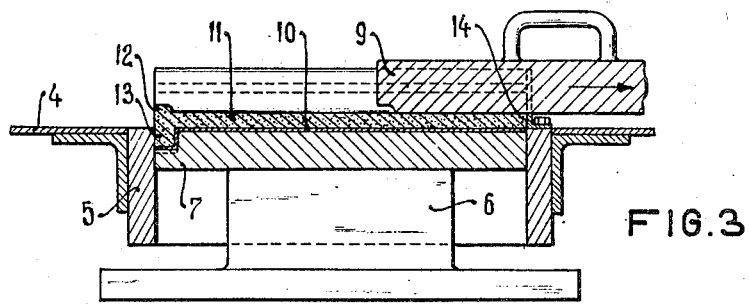

In order that my invention may be well understood, I shall now proceed to describe the same in further detail with reference to the annexed drawing, in which:

Fig. 1 is a top plan view of the mould frame accommodating a moulded tile, and of the templet, after removal of the top plate, Fig. 2 is a sectional elevation along the line II—II in Fig. 1, and Fig. 3 is a sectional elevation along the line III—III in Fig. 1, it being understood that Figs. 2 and 3 also illustrate elements of a stamping machine, of which the mould frame forms a part.

4 is the rotary table of the stamping machine. Said table supports a circular series of mould frames 5, one of which only has been illustrated. The anvil is designated by 6, the rigid bottom plate by 7, the ram by 8, and the rigid top plate, which is provided with handles, by 9. Resting on the bottom plate 7 is a thin sheet 10 having the same profile as said plate. The work piece 11, moulded between sheet 10 and top plate 9, is a tile, whose profile, clearly shown in Fig. 2, extends through the entire length of the tile, abstracting from ribs 12 and 13 provided on the top face and on the bottom face, respectively, and running along the top edge of the tile, it being understood that the height of each of said ribs decreases inwardly. Consequently, and abstracting from rib 12, the top face of the tile is a ruled surface, whose generators are straight lines running parallel with both sides of the mould, and the same is true for the bottom face.

If the tile has been moulded by a number of blows of the ram 8, and if the bottom plate 7, together with the suitably oiled sheet 10, tile 11 and top plate 9, has been sufficiently raised relative to the mould frame 5, the top plate could obviously be slid off the tile in a direction parallel with the generators of the said ruled surface, if the adhesion between said plate and the tile were not such as to prevent said removal without damage to the work piece. In view thereof, a templet 14, constituted as a flat strip, is secured to the mould box along the front top edge thereof, the rear face of said templet being flush with the front wall of the mould box (see Fig. 3), and the top edge thereof having exactly the same profile as the top plate 9, as clearly shown in Fig. 2. Said templet prevents the material of the tile from following the sliding movement of the top plate, so that the work piece, together with the sheet 10, can be lifted from the mould frame without being damaged and thereafter placed on a drying board.

It is pertinent here to remark that, as an alternative, the moulded work piece can also be removed from the mould frame together with plates 7, 9 and sheet 10, and this aggregate placed on a table provided with a templet as described, the top plate 9 being thereupon removed from the work piece in the manner referred to. During this operation, a second work piece can be moulded in the frame 5. In this case a second set of plates 7, 9 is required, but the capacity of the press is appreciably increased.

Finally it goes without saying that the work piece could also be moulded by a pressing operation, or by vibration, or by an equivalent operation, and also, that the described apparatus can be used for manufacturing work pieces of any material tending to adhere to the moulding plates.

What I claim is:

1. Apparatus for molding members of concrete or the like, comprising a frame for containing the molded member, an anvil-like bottom, a bottom plate disposed for reciprocating movement within said frames, a top plate disposed for coaction with said bottom plate and for independent sideway movement off said frame, and a template having a profile corresponding to that of one of the end faces of the molded member secured to said frame at an elevation corresponding to an elevated position of said bottom and top plate and the molded member, whereby the top plate may be slid off the member and said template prevents damage to the edge of the end face of the member.

2. Apparatus according to claim 1, wherein said top and bottom plates have complementary straight line projections parallel to one side of said frame and said template has a profile corresponding to a section of the molded member as formed by said projections.

BARTUS A. NIJLAND.

REFERENCES CITED

The following references are of record in the file of this patent:

UNITED STATES PATENTS

| Number | Name | Date |
| --- | --- | --- |
| 937,105 | Simons | Oct. 19, 1909 |
| 1,114,168 | Melde | Oct. 20, 1914 |